(12) United States Patent
Graham

(10) Patent No.: US 7,093,889 B2
(45) Date of Patent: Aug. 22, 2006

(54) DEVICE FOR REDUCING VEHICLE AERODYNAMIC RESISTANCE

(75) Inventor: Sean C. Graham, Seattle, WA (US)

(73) Assignee: Freight Wing Inc., Seattle, WA (US)

( * ) Notice: Subject to any disclaimer, the term of this patent is extended or adjusted under 35 U.S.C. 154(b) by 141 days.

(21) Appl. No.: 10/957,044

(22) Filed: Oct. 4, 2004

(65) Prior Publication Data

US 2006/0152038 A1    Jul. 13, 2006

(51) Int. Cl.
*B60R 27/00* (2006.01)

(52) U.S. Cl. .................. 296/180.4; 296/180.1

(58) Field of Classification Search ............ 296/180.1, 296/180.2, 180.3, 180.4, 180.5
See application file for complete search history.

(56) References Cited

U.S. PATENT DOCUMENTS

| | | | | |
|---|---|---|---|---|
| 4,262,953 A | | 4/1981 | McErlane | 296/180.4 |
| 4,386,801 A | * | 6/1983 | Chapman et al. | 296/180.1 |
| 4,486,046 A | | 12/1984 | Whitney et al. | 296/180.4 |
| 4,611,847 A | * | 9/1986 | Sullivan | 296/180.2 |
| 4,640,541 A | * | 2/1987 | FitzGerald et al. | 296/180.1 |
| 4,810,021 A | * | 3/1989 | Burst | 296/180.1 |
| D317,425 S | | 6/1991 | Vysotsky et al. | D12/97 |
| 5,277,444 A | | 1/1994 | Stropkay | 280/848 |
| 5,280,990 A | | 1/1994 | Rinard | 296/180.1 |
| 5,375,882 A | * | 12/1994 | Koch, III | 296/180.1 |
| 5,609,384 A | | 3/1997 | Loewen | 296/180.4 |
| 6,685,256 B1 | | 2/2004 | Shermer | 296/180.4 |
| 2002/0021023 A1 | * | 2/2002 | Leban | 296/180.1 |

* cited by examiner

*Primary Examiner*—Lori L. Coletta

(57) ABSTRACT

A device for reducing vehicle aerodynamic resistance for vehicles having a generally rectangular body disposed above rear wheels, comprising a plurality of load bearing struts attached to the bottom of the rectangular body adjacent its sides, a plurality of opposing flat sheets attached to the load bearing struts, and angled flaps attached to the lower edge of the opposing sheets defining an obtuse angle with the opposing flat sheets extending inwardly with respect to the sides of the rectangular body to a predetermined height above the ground, which, stiffen the opposing flat sheets, bend to resist damage when struck by the ground, and guide airflow around the rear wheels of the vehicle to reduce its aerodynamic resistance when moving.

20 Claims, 5 Drawing Sheets

DEVICE FOR REDUCING VEHICLE AERODYNAMIC RESISTANCE

This invention was made with Government support under Contract No. DE-FC36-03G013173 awarded by the Department of Energy. The Government has certain rights in this invention.

TECHNICAL FIELD

The invention relates to a device for reducing the aerodynamic resistance of a moving, rectangular shaped vehicle and more particularly to a pair of opposing airfoils that are mounted underneath the vehicle adjacent its sides.

BACKGROUND ART

It is well known that streamlining the undercarriage of a long vehicle such as a trailer truck or straight van truck will reduce the aerodynamic resistance of a moving vehicle and thus save fuel. However, streamlining the undercarriage of a long vehicle such as a semi-trailer is impractical because integrated enclosures are heavy, costly, easily damaged, interfere with standardized structural design, and prevent access to parts and equipment underneath the vehicle. Consequently, removable attachments have been designed to streamline the undercarriage of long vehicles. However, past designs for removable attachments have failed to achieve significant utilization because they are typically large and heavy enclosures or one piece structures, which are difficult to transport when not mounted on the trailer, difficult to mount, require drilling or welding the undercarriage when mounting, incompatible with different trailer and truck geometries, easily damaged, difficult to repair, become filled with snow and ice in winter driving conditions, do not provide the maximum drag decrease possible, and are too costly to generate a significant return on investment though associated fuel use reductions. The device described herein uses a minimal amount of material resulting in reduced weight and production costs and provides a maximized drag reduction. Prototypes of the device, constructed under U.S. Government contract No. DE-FC36-03G013173 awarded by the Department of Energy, weighed under 150 lbs and reduced a semi-trailer's fuel consumption by 4% in Society of Automotive Engineer's (SAE) J1321 type II standardized fuel economy tests conducted by a respected independent research center. The improved aerodynamic performance of the devise described herein when compared to past designs for aerodynamic attachments, that extend the side wall of the truck or trailer directly toward the ground, is due to the addition of angled flaps directed toward the center of the vehicle. The geometry of the angled flaps was tuned to provide the maximum drag reduction possible by directing crosswind airflow beneath the trailer's rear wheels and axles. The straight side extensions of past designs create low pressure vacuums that tend to direct crosswind airflow into the wheels and axles and can cause large side forces that push the vehicle off its intended course. The angled flaps also provide stiffing means, necessary to prevent the wind induced flapping or oscillations common to the straight side extensions of past designs. Unlike the straight side extensions of past designs, which tend to buckle or collapse in a random fashion if struck by protrusions on the ground (or the ground when the vehicle travels over uneven surfaces) and may sustain damage even if constructed of flexible materials, the angled flaps bend uniformly toward the vehicle if stuck by the ground and return to their original position. The device described herein is easily packaged and shipped, can be easily mounted on the undercarriage of trailers and trucks of different geometries and construction without modification, requires no welding or drilling in the undercarriage when mounting, resists damage, and damaged areas can be easily repaired with replacement parts. The device described herein does not enclose the undercarriage of the trailer like past designs, thereby preventing snow and ice build-up and allowing convenient access to parts underneath the trailer or truck. Unlike past designs, the device described herein also improves road safety by absorbing significant impact in the event of a side collision. Absorbing side impact helps prevent passenger vehicles from entering the area underneath the trailer, which often results in serious accidents because the vehicle is crushed by the trailers rear wheels.

DISCLOSURE OF THE INVENTION

In general, a device for reducing vehicle aerodynamic resistance disposed on the bottom of a vehicle having a generally rectangular body disposed above rear wheels, when made in accordance with this invention, comprises a plurality of load bearing struts of a predetermined size attached to the bottom of the rectangular body adjacent the sides thereof which can absorb impact in the event of a side collision. A plurality of impact absorbing members extending between adjacent load bearing struts and fastened thereto which can absorb impact in the event of a side collision. A plurality of opposing flat sheets attached to the load bearing struts. Front opposed flat sheets disposed toward the front of the rectangular body, intermediate opposed flat sheets disposed behind the front opposed flat sheets, and rear opposed flat sheets disposed toward the rear of the rectangular body, each having a top edge disposed adjacent the bottom and side of the rectangular body, and a lower edge disposed a predetermined height above the ground surface and below the bottom of the rectangular body. A plurality of angled flaps attached to the lower edges of the intermediate and rear opposed flat sheets, each defining an obtuse flap angle with respect to each attached opposed flat sheet, extending inwardly with respect to the sides of the rectangular body, to a predetermined height above the ground surface. Whereby the opposing flat sheets are stiffened by the angled flaps, which flex toward the rectangular body if struck by the ground surface to resist damage, and airflow is directed around the rear wheels to reduce the aerodynamic resistance of the vehicle when moving.

BRIEF DESCRIPTION OF THE DRAWINGS

The invention as set forth in the claims will become more apparent by reading the following detailed description in conjunction with the accompanying drawings, wherein like reference numerals refer to like parts throughout the drawings and in which:

BEST MODE FOR CARRYING OUT THE INVENTION

Figure 1:
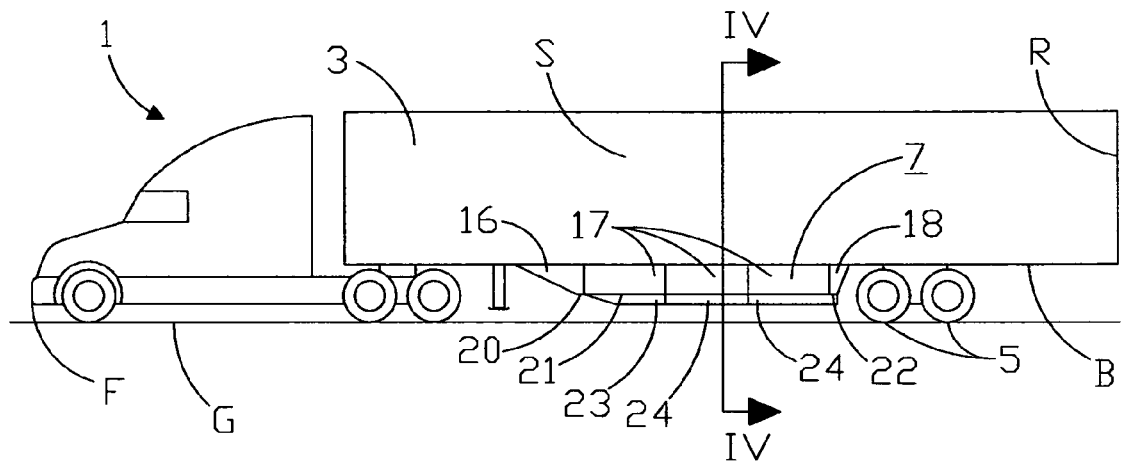
FIG. 1 is a side elevational view of a vehicle with a rectangular body with an airfoil devise made in accordance with this invention disposed thereon.
Figure 2:
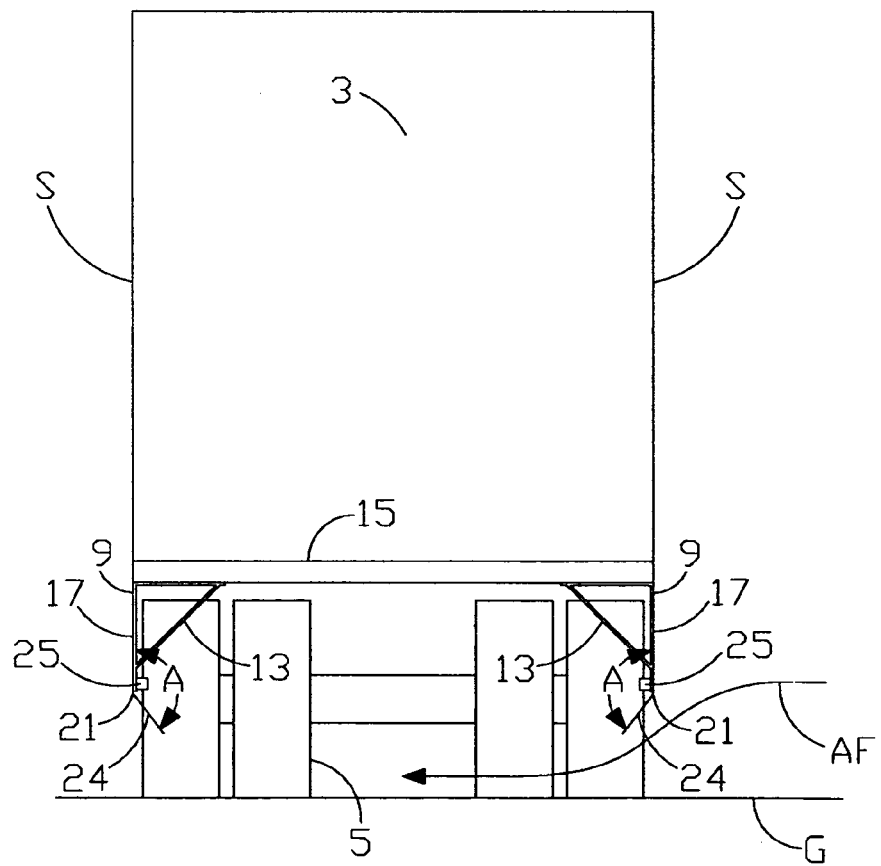
FIG. 2 is a sectional view taken on line IV—IV of FIG. 1.

Referring now to the drawings in detail and in particular to FIGS. 1 and 2, there is shown a vehicle 1 such as a trailer truck, having a generally rectangular body 3 having a front F, rear R, bottom B and opposed sides S mounted above rear wheels 5 and a device 7 for reducing the aerodynamic resistance of the vehicle 1 when it moves. The device 7 comprises a pair of opposed airfoils 9 disposed beneath the rectangular body 3 adjacent its sides S and are preferably made of aluminum, but of course other material could be utilized. Each opposing airfoil comprises load bearing struts 13, which are removably attached to the vehicle cross members 15. The load bearing struts 13 having predetermined dimensions are designed to carry loads from different directions and absorb impact from side collisions. They are shown fabricated from strips of flat sheets bent and joined to form a triangle. Opposed flat sheets 16, 17 and 18 are attached to the load bearing struts 13 adjacent the sides S and bottom B of the rectangular body 3 and extend to a lower edge 20, 21 and 22, respectively, at a predetermined height above the ground surface G. The lower edges 20, 21 and 22 of the opposing flat sheets 16, 17 and 18 are approximately 20 inches above the ground surface G. Front opposed flat sheets 16 are disposed toward the front F of the vehicle. Rear opposed flat sheets 18 are disposed toward the rear R of the vehicle. Intermediate opposed flat sheets 17 are disposed behind the front opposed flat sheets 16 and in front of the rear opposed flat sheets and are generally rectangular. While only three intermediate opposed flat sheets 17 are shown, it is understood that any number of intermediate opposed flat sheets 17 could be used to accommodate rectangular bodies 2 of different lengths. Angled flaps 23 and 24 are bent to form an obtuse flap angle A, preferably less than 160 degrees, with their apexes adjacent the lower edges 21 and 22. Forward angled flaps 23 are fastened to the intermediate opposed flat sheets 17 adjacent the front opposed flat sheets 16. Rearward angled flaps 24 are fastened to the other intermediate opposed flat sheets 17 and rear opposed flat sheets 18 with their apexes adjacent the lower edges 21 and 22. The angled flaps 23 and 24 extend to a predetermined height above the ground surface G, which is approximately 13 inches. The angled flaps 23 and 24 direct cross-wind airflow AF below the forward portion of the rear wheels 5 of the vehicle 1 to reduce associated drag forces. The angled flaps 23 and 24 can bend toward the rectangular body 3, if struck by protrusions on the ground surface G or an uneven ground surface and return to their original position. Rolled shapes such as angles or channels may be utilized as impact absorbers 25 and are attached to the load bearing struts 13 adjacent the lower edges 21 of the intermediate opposed flat sheets 17 as an additional means of absorbing impact from side collisions. It is understood that the impact absorbers 25 are an optional addition to the aerodynamic devise 7, which some users may choose not to employ because of increased weight and cost.

Figure 3:
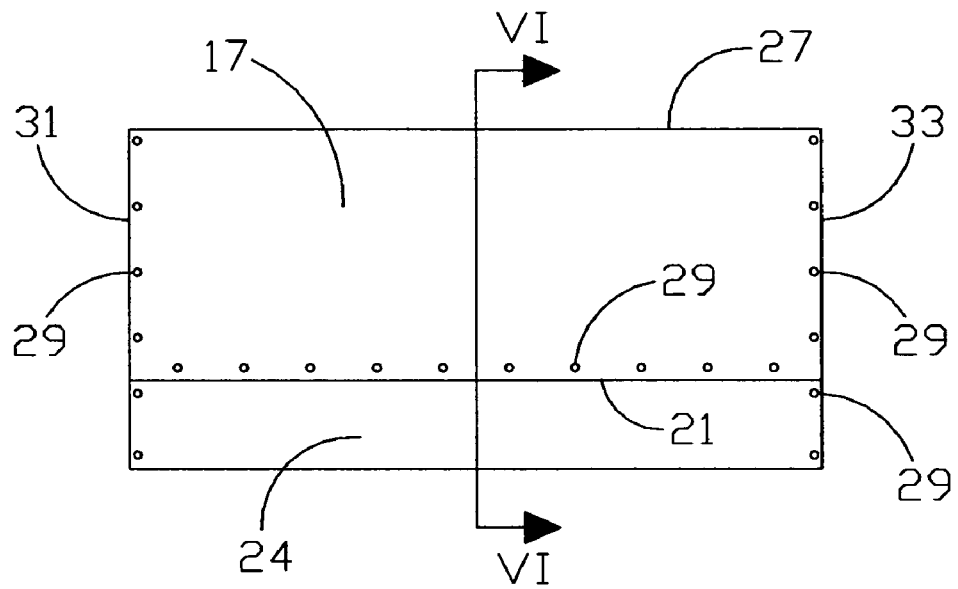
FIG. 3 is a side elevational view of an opposing flat sheet and attached angled flap.
Figure 4:
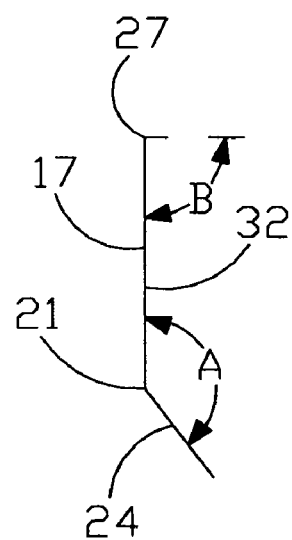
FIG. 4 is a sectional view taken on line VI—VI of FIG. 3.

FIGS. 3 and 4 show an intermediate opposed flat sheet 17 having a top portion bent at an angle B, generally about 90 degrees, to form flange 27 to stiffen the upper end of the intermediate opposed flat sheet 17 and help prevent wind induced oscillations. Front opposed flat sheets 16 and rear opposed flat sheets 18 are also bent to form the flange 27 but they are not shown. Rivets 29 or other fastening means are typically utilized to fasten the opposed flat sheets 16, 17 and 18 to the load bearing struts 13 and the angled flaps 23 and 24 adjacent to the bottom edges 21 and 22 of the opposed flat sheets 17 and 18 so that they can be replaced if damaged. It is understood that the angled flaps 23 and 24 could also be bent into the opposed flat sheets 17 and 18. The obtuse flap angle A, preferably less than 160 degrees, stiffens the lower edges 21 and 22 of the opposed flat sheets 17 and 18 and cooperates with the flanges 27 to stiffen the opposed flat sheets 17 and 18 to prevent wind induced oscillations.

Figure 5:
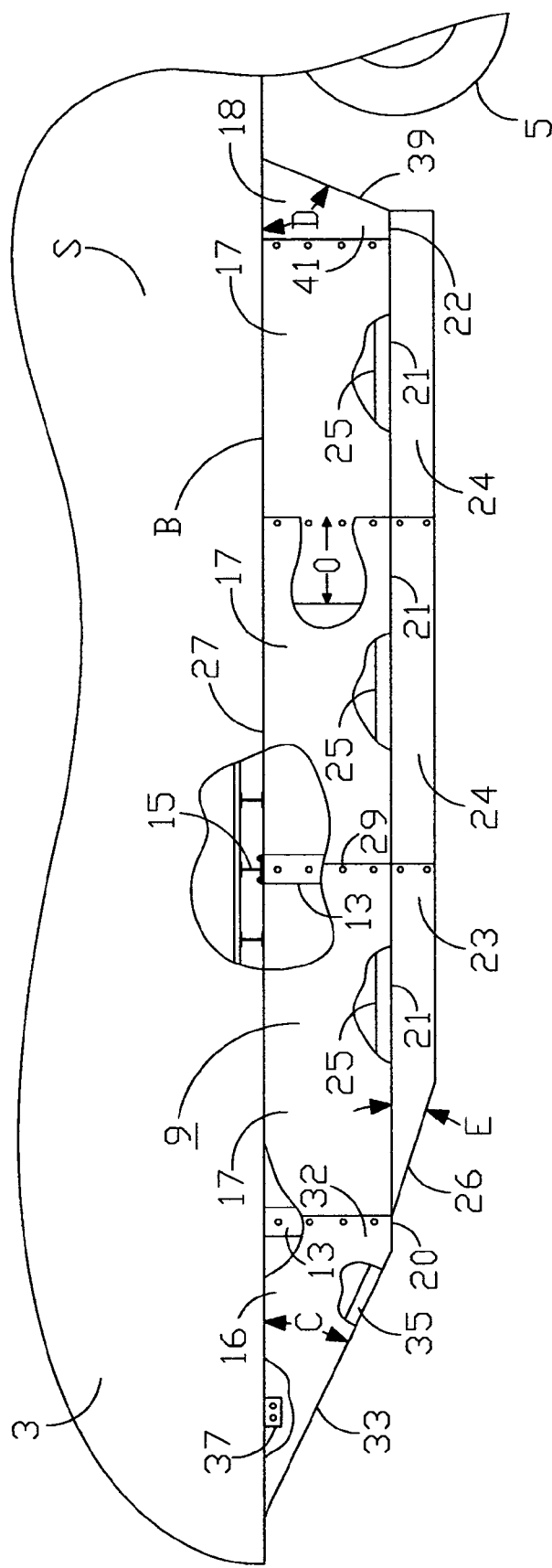
FIG. 5 is a partial side elevational view of a vehicle showing typical installation of the airfoil devise.

FIG. 5 shows a typical installation of an opposed airfoil 9 on a rectangular body 3. Load bearing struts 13 are removably attached to vehicle cross members 15 approximately every 5 feet along the vehicles side S, but could be spaced differently. Impact absorbing members 25 extend between the load bearing struts 13 and are removably fastened thereto. The opposed flat sheets 16, 17 and 18 are fastened to the load bearing struts 13 by rivets 29. Adjacent opposed flat sheets overlap, when attached to a common load bearing strut 13. The amount of overlap can be varied to accommodate different rectangular body lengths and overcome inconsistencies in the spacing of vehicle cross members 15 as shown by the extended overlap O. The front opposed flat sheets 16 have front edges 33 that form acute angles C, preferably less than 30 degrees, with respect to the bottom B of the rectangular body 3, and rectangular portions 32 with bottom edges 20. Front edges 33 of the opposed flat sheets 16 have angles, channels or other stiffeners attached adjacent thereto to form stiffening members 35, which cooperate with the flanges 27 to prevent wind induced oscillations. Small load bearing struts 37 are removably attached to a vehicle cross member 15 to support the front opposed flat sheets 16. The rear opposed sheets 18 have rear edges 39, which form acute angles D, preferably less than 70 degrees, with respect to the bottom B of the rectangular body 3 and a rectangular portions 41 with bottom edges 22. Forward angled flaps 23 have forward edges 26 below the apex of obtuse flap angle A that form acute angles E, preferably less than 20 degrees, with respect to the lower edges 21.

Figure 6:
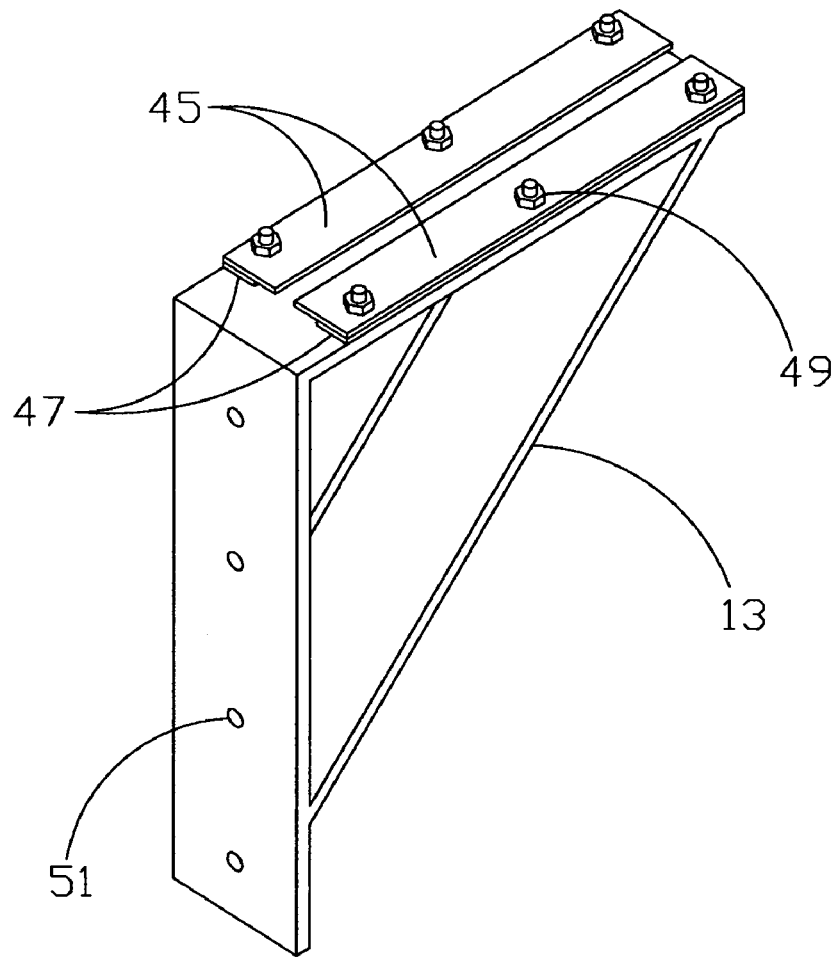
FIG. 6 is an isometric view of a load bearing strut and clamping means.
Figure 8:
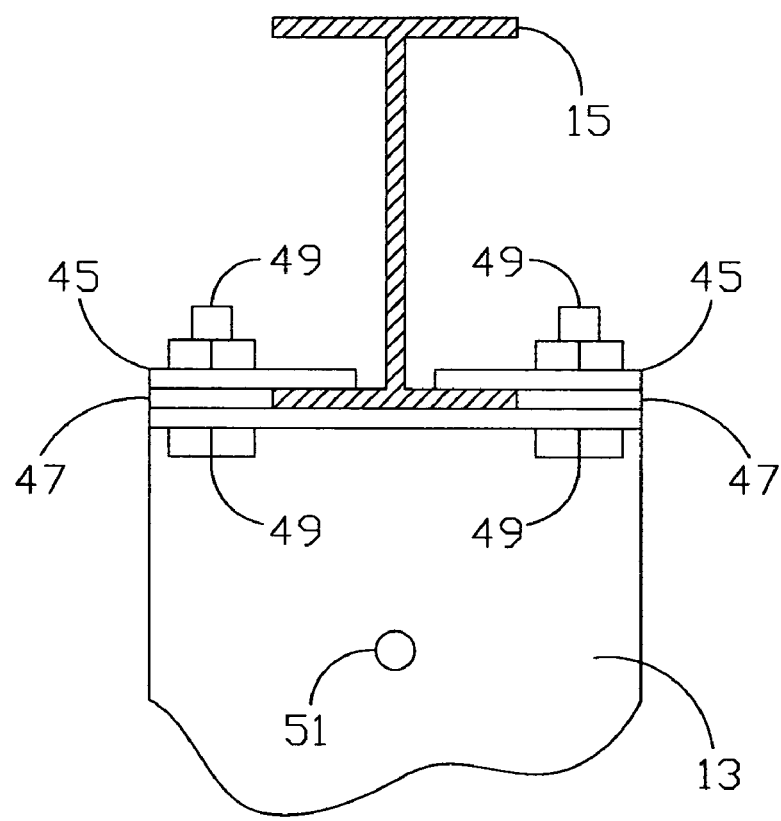
FIG. 8 is a partial rear elevational view of a load bearing strut and clamping means.

FIGS. 6 and 8 show a load bearing strut 13 that has opposing clamping sheets 45 and spacer sheets 47 fastened thereto by bolts 49 such that it can be removably attached to a vehicle cross member 15. Rivet holes 51 allow the opposed flat sheets 16, 17 and 18 to be attached to the load bearing struts 13.

Figure 7:
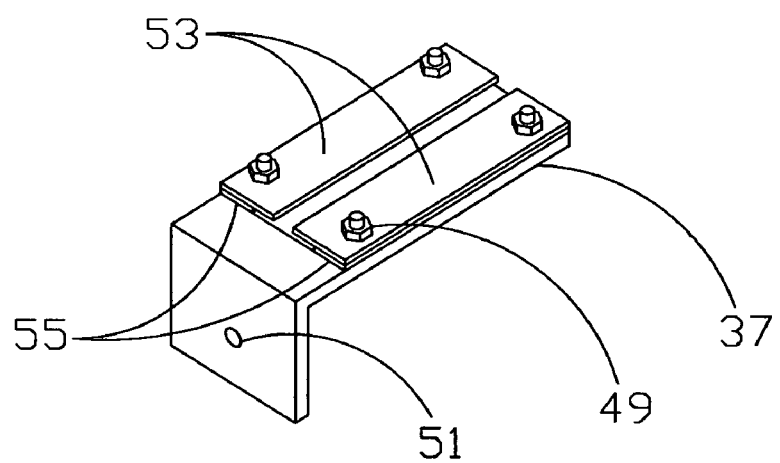
FIG. 7 is an isometric view of a small load bearing strut and clamping means.

FIG. 7 shows a small load bearing strut 37 that has opposing small clamping sheets 53 and small spacer sheets 55 fastened thereto by bolts 49 such that it can be removably attached to a vehicle cross member 15. Rivet hole 51 allows the front opposed flat sheet 16 to be attached to the small load bearing strut 37.

Figure 9:
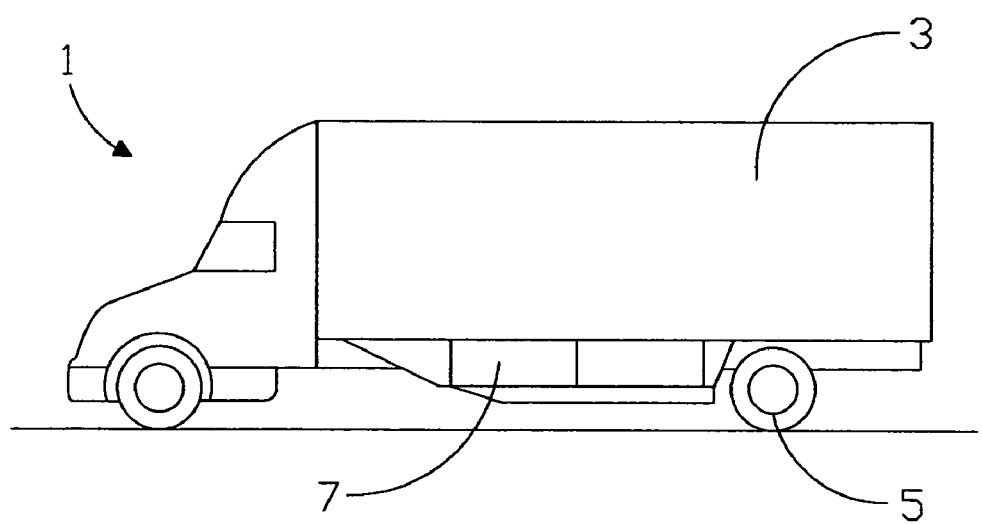
FIG. 9 is a side elevational view of a vehicle with a rectangular body of different geometry and an airfoil device made in accordance with this invention disposed thereon.

FIG. 9 shows a preferred embodiment of the device 7 attached to a vehicle 1 of different geometry having a rectangular body 3 that is not a detachable trailer.

While the preferred embodiments described herein set forth the best mode to practice this invention presently contemplated by the inventor, numerous modifications and adaptations of this invention will be apparent to others of ordinary skill in the art. Therefore, the embodiments are to be considered as illustrative and exemplary and it is understood that the claims are intended to cover such modifications and adaptations as they are considered to be within the spirit and scope of this invention.

INDUSTRIAL APPLICABILITY

An aerodynamic reducing device 7 for a vehicle 1 as set forth in this invention provides a device 7, which is economical to manufacture and to maintain, and is easily packaged, transported, and installed in the field on rectangular vehicles of varying geometry. It provides a pair of removable airfoil portions that will substantially reduce the aerodynamic resistance of the moving vehicle 1, thus reducing fuel consumption, fuel cost and air pollution.

What is claimed is:

1. A device for reducing aerodynamic resistance of a vehicle, having a generally rectangular body with a front, a rear, a bottom, and sides disposed above rear wheels, which positions the rectangular body a predetermined position above a ground surface, the device comprising: a plurality of load bearing struts of a predetermined size attached to the bottom of the rectangular body adjacent the sides thereof; a plurality of opposed flat sheets, front opposed flat sheets disposed toward the front of the rectangular body, intermediate opposed flat sheets disposed behind the front opposed flat sheets, and rear opposed flat sheets disposed toward the rear of the rectangular body, each having a top edge disposed adjacent the bottom and side of the rectangular body, a lower edge disposed at a predetermined height above the ground surface and below the bottom of the rectangular body, and fastened to the load bearing struts; and a plurality of angled flaps fastened adjacent the lower edges of the intermediate opposed flat sheets and rear opposed flat sheets, each angled flap forming an obtuse angle with respect to each attached opposed flat sheet, extending inwardly with respect to the sides of the rectangular body, and extending to a predetermined height above the ground surface; whereby the intermediate opposed flat sheets and rear opposed flat sheets are stiffened by the angled flaps, which flex toward the generally rectangular body if struck by protrusions on the ground surface to resist damage; so that airflow is directed around the rear wheels reducing the aerodynamic resistance of the vehicle when moving.

2. A device as set forth in claim 1, wherein the number and length of intermediate opposed flat sheets can be varied to adjust the overall length of the devise to accommodate vehicles of different lengths.

3. A device as set forth in claim 1, wherein two opposed flat sheets are attached to each load bearing strut.

4. A device as set forth in claim 3, wherein the opposed flat sheets overlap the load bearing struts and are attached thereto by the same fastening means.

5. A device as set forth in claim 4, wherein the overlap of the intermediate opposed flat sheets varies to adjust the length of the devise to accommodate vehicles of different lengths.

6. A device as set forth in claim 1, wherein the top edges of the opposed flat sheets are stiffened.

7. A device as set forth in claim 1, wherein the top edges of the opposed flat sheets are stiffened by bending the top edges of the opposed flat sheets approximately 90 degrees towards each other.

8. A device as set forth in claim 1, wherein the angled flaps are removably attached to the intermediate opposed flat sheets and rear opposed flat sheets.

9. A device as set forth in claim 1, wherein the front opposed flat sheets have front edges forming an acute angle with respect to the bottom of the rectangular body and rear rectangular portions fastened to the load bearing struts.

10. A device as set forth in claim 9, wherein the front edges of the front opposed flat sheets are stiffened.

11. A device as set forth in claim 1, wherein the angled flaps disposed toward the front of the rectangular body have forward edges forming an acute angle with respect to the lower edges of the respective intermediate opposed flat sheets.

12. A device as set forth in claim 1, wherein the rear opposing flat sheets have rear edges forming an acute angle with respect to the bottom of the rectangular body and forward rectangular portions fastened to the load bearing struts.

13. A device as set forth in claim 1, wherein the load bearing struts are generally triangularly shaped.

14. A device as set forth in claim 1, wherein the load bearing struts are generally triangularly shaped and are removably attached to the bottom of the rectangular body.

15. A device as set forth in claim 14, wherein the load bearing struts are removably attached to the rectangular body by clamping means comprising a pair of opposing clamping plates that are fastened to each load bearing strut by bolts.

16. A device as set forth in claim 1, wherein impact absorbing members extend between adjacent load bearing struts and are fastened thereto to absorb impact in event of a side collision.

17. A device as set forth in claim 13, wherein impact absorbing members extend between adjacent load bearing struts and are fastened thereto to absorb impact in event of a side collision.

18. A device as set forth in claim 14, wherein impact absorbing members extend between adjacent load bearing struts and are fastened thereto to absorb impact in event of a side collision.

19. A device as set forth in claim 1, wherein the opposed flat sheets are attached to the load bearing struts by rivets.

20. A device for reducing aerodynamic resistance of a vehicle, having a generally rectangular body with a front, rear, bottom and opposing sides disposed above rear wheels, which positions the rectangular body a predetermined position above a ground surface, the device comprising: a plurality of load bearing struts of a predetermined size attached to the bottom of the rectangular body adjacent the sides thereof; a plurality of opposed flat sheets, front opposed flat sheets disposed adjacent the bottom and sides of the rectangular body and toward the front thereof and having front edges that form an acute angle with respect to the bottom of the rectangular body and rectangular rearward portions fastened to the load bearing struts; a plurality of rectangular intermediate opposed flat sheets disposed adjacent the bottom and sides of the rectangular body and the front opposed flat sheets and fastened to the load bearing struts; rear opposed flat sheets disposed adjacent the bottom and sides of the rectangular body and towards the rear thereof and having rear edges forming acute angles with respect to the bottom of the rectangular body and rectangular forward portions fastened to the load bearing struts and adjacent the intermediate opposed flat sheets; each opposed flat sheet having a top portion disposed adjacent the bottom and sides of the rectangular body bent generally at right angles to form flanges extending toward the opposing flat sheet, a lower edge disposed a predetermined height above the ground surface and below the bottom of the rectangular body, and overlapping adjacent opposed flat sheets attached to common load bearing struts; a plurality of angled flaps attached to the lower edges of the intermediate opposing flat sheets and rear opposing flat sheets, each angled flap forming an obtuse angle with respect to the attached flat sheet and extending inwardly with respect to the sides of the rectangular body, and extending to a predetermined height above the ground surface; whereby the opposing flat sheets are stiffened by the angled flaps, which flex toward the bottom of rectangular body, if struck by protrusions on the ground surface to resist damage, and airflow is directed around the rear wheels to reduce the aerodynamic resistance of the vehicle when moving and the flanges and angled flaps cooperate to stiffen the opposed intermediate flat sheets to prevent wind induced oscillations.

* * * * *